US 6,675,939 B2

(12) United States Patent
Maurice et al.

(10) Patent No.: US 6,675,939 B2
(45) Date of Patent: Jan. 13, 2004

(54) ELEVATOR BRAKE ASSEMBLY

(75) Inventors: Kevin L. Maurice, Bristol, CT (US); Timothy J. Dahlstrom, Unionville, CT (US); Stephen E. Nyquist, Simsbury, CT (US); Jon L. Masthay, Plantsville, CT (US)

(73) Assignee: Inertia Dynamics, Inc., Collinsville, CT (US)

(*) Notice: Subject to any disclaimer, the term of this patent is extended or adjusted under 35 U.S.C. 154(b) by 179 days.

(21) Appl. No.: 09/773,722

(22) Filed: Jan. 31, 2001

(65) Prior Publication Data
US 2002/0100646 A1 Aug. 1, 2002

(51) Int. Cl.⁷ .............................................. B60T 13/04
(52) U.S. Cl. ...................................... 188/171; 188/161
(58) Field of Search ................................ 188/156, 157, 188/158, 161, 162, 166, 167, 170, 171, 173, 218 XL, 71.1, 71.3, 71.4, 71.5, 73.1

(56) References Cited

U.S. PATENT DOCUMENTS

| | | | |
|---|---|---|---|
| 2,949,172 A | * 8/1960 | Simons | 188/171 |
| 3,095,071 A | 6/1963 | Mason | |
| 3,149,705 A | 9/1964 | Shoquist | |
| 3,149,706 A | 9/1964 | Mason et al. | |
| 3,171,523 A | 3/1965 | Shoquist | |
| 3,177,996 A | 4/1965 | Bates | |
| 3,613,838 A | * 10/1971 | Pape | 188/171 |
| 3,642,106 A | 2/1972 | Baer | |
| 3,685,622 A | 8/1972 | Baer et al. | |
| 4,201,281 A | 5/1980 | MacDonald | |
| 4,271,948 A | 6/1981 | Yew | |
| 4,290,393 A | 9/1981 | Hart et al. | |
| 4,380,049 A | * 4/1983 | Makinen | 187/291 |
| 4,457,404 A | * 7/1984 | Husson et al. | 187/277 |
| 4,863,528 A | 9/1989 | Brown et al. | |
| 4,997,067 A | 3/1991 | Watts | |
| 5,186,286 A | * 2/1993 | Lindberg | 188/171 |
| 5,255,760 A | * 10/1993 | Lamb et al. | 170/612 |
| 5,669,469 A | * 9/1997 | Ericson et al. | 188/171 |
| 5,687,822 A | 11/1997 | Arai | |
| 5,717,174 A | * 2/1998 | Ramos | 187/288 |
| 5,814,986 A | * 9/1998 | Goskowicz et al. | 324/207.26 |
| 5,967,274 A | 10/1999 | Leone et al. | |
| 6,047,805 A | 4/2000 | Nyquist et al. | |
| 6,125,975 A | * 10/2000 | Seeto et al. | 188/171 |
| 6,155,386 A | * 12/2000 | Hirai et al. | 188/171 |
| 6,161,659 A | * 12/2000 | Maurice | 188/171 |
| 6,182,803 B1 | * 2/2001 | Hirai et al. | 188/171 |
| 6,349,800 B1 | * 2/2002 | Nakamura | 188/71.5 |

FOREIGN PATENT DOCUMENTS

| GB | 2 126 347 A1 | * 3/1984 | |
|---|---|---|---|
| JP | 58-131433 | 8/1983 | 192/84.81 |

OTHER PUBLICATIONS

Stephen R. Matt, Electricity and basic electronics 1982, Goodheart–Willcox, pp. 225–226.*
William Eaton, The inductive proximity sensor: Industry's workhorse, Chilton's I&CS Sep. 1989, pp. 51–53.*

* cited by examiner

Primary Examiner—Jack Lavinder
Assistant Examiner—Thomas J. Williams
(74) Attorney, Agent, or Firm—McCarter & English, LLP

(57) ABSTRACT

The brake includes a housing for mounting and a disc assembly. The disc assembly engages a drive shaft for rotation therewith. A flange on the disc assembly receives a first ring and a second ring, each ring is slideably engaged to the flange for axial motion. Release plates adjacent to the second ring are free to move in an axial direction. A field cup has springs to bias the release plates against the second ring and o-rings to facilitate quiet operation of the elevator car brake. When no current flows through the coil, the release plates are biased against the second ring. Thus, the second ring engages the friction surface of the housing to park and hold the drive shaft. When current flows through the coil, the first and second release plates are drawn to the field cup, overcome the bias force of the springs and compress the o-rings.

27 Claims, 12 Drawing Sheets

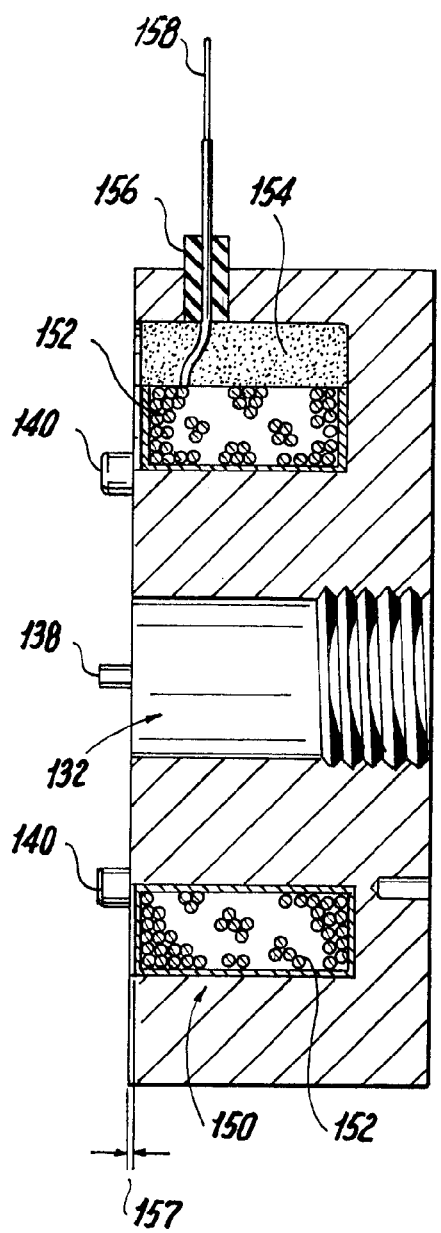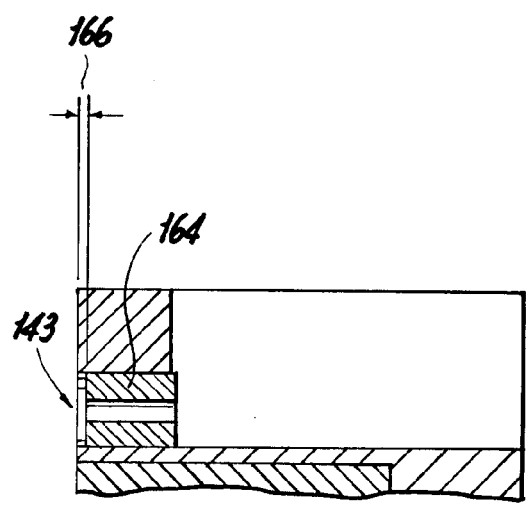
FIG. 4B
FIG. 4C

ELEVATOR BRAKE ASSEMBLY

BACKGROUND OF THE INVENTION

The subject application relates generally to elevator systems and to brakes for elevator systems, and more particularly to an improved system for braking an elevator. Elevator brakes are used to insure an elevator car stops at the appropriate point and time in the appropriate manner.

Safety regulations concerning the operation of elevators require failsafe brake mechanisms. Typically a plurality of braking mechanisms are provided to hold the elevator car in place when it stops at a landing. The braking mechanisms also serve to stop and stabilize the elevator car during emergency situations such as when there is a system failure, the brake mechanisms must stop the elevator car from uncontrolled travel within the shaft.

Generally, an elevator system comprises a motor, drive shaft and brake system controlling an elevator car within a shaft or hoistway. Traditional techniques for controlling the elevator car also include the use of a counterweight. Several devices have been developed to serve the braking function. Many deployed brake systems apply a frictional force upon the guiderails guiding the elevator car. Such brake systems have deployed a brake surface on one side of the guiderail and a leaf spring and roller assembly on the opposite side of the guiderail. The safety brakes are attached directly to the frame of the elevator car or the counterweight to receive the large load applied in braking thereupon. Alternatively, brake apparatus have utilized drum brakes and disc brakes which engage the drive shaft of the elevator motor. In order to set the gap between the braking surfaces and the guiderails, conventional brakes require a mounting plate and stand-offs.

Many prior art elevator systems located the control system, drive mechanism, brake mechanism, governor and like components outside the hoistway because the bulky machinery had burdensome space and noise requirements. Often, a facilities room had to be built outside the shaft, usually on the roof to accommodate the elevator car arriving at the top landing. A facilities room added additional expense and construction time. Further, the facilities room detrimentally affects the building aesthetics. The position of the brake mechanisms in the facilities room limited the need to require silent operation of the brake mechanisms because the facilities room was remote and muffled most of the potentially disconcerting noises from the passengers. As a result of the size of the facilities room, the size of the brake mechanism was also of reduced importance.

Some examples of elevator brake mechanisms are illustrated in U.S. Pat. No. 5,495,919 to Ericson et al., U.S. Pat. No. 5,669,469 to Ericson et al. U.S. Pat. No. RE36,034 to Sheridan, U.S. Pat. No. 5,717,174 to Ramos, the disclosure of each is herein incorporated by reference to the extent it is consistent with the present application.

In view of the above undesirability of having a facilities room and shortcomings of the prior art, there are problems associated with locating conventional elevator brake mechanisms within the space allotted for the elevator car. In particular, prior art elevator brake mechanism required significant amounts of space. Further, prior art elevator brake mechanisms required redundant systems and performed in an undesirably noisy manner. Therefore, there is a need for an improved elevator brake assembly which fits unobtrusively within the hoistway, performs in a suitably quiet manner relative to passengers in the elevator car, and assures adequate braking performance and redundancy.

SUMMARY OF THE INVENTION

The present disclosure provides an elevator car brake having redundancy for parking and holding an elevator motor with an elongated drive shaft. The elevator car brake includes a brake housing for mounting the elevator car brake to the elevator motor. The brake housing has a friction surface. A disc assembly has a body portion adapted and configured to be contained within the housing. The disc assembly is axially fixed with respect to the elongated drive shaft and engaged to rotate therewith. A flange on the disc assembly receives a first ring and a second ring. Each ring is slideably engaged to the flange for motion in an axial direction where the first ring is adjacent to the friction surface of the housing. A first release plate and a second release plate have respective friction surfaces. The first and second release plates are free to move in an axial direction, each release plate being adjacent to the second ring. A fixed field cup combines with the housing to encompass each of the components. The fixed field cup has an adjustment cap for varying the compression of a portion of the plurality of springs and an electromagnetic coil for creating a magnetic field when current flows therethrough. The fixed field cup also has a plurality of springs to bias the first and second release plates against the second ring and a plurality of o-rings in a face of the field cup.

When no current flows through the electromagnetic coil, at least one of the release plates is biased against the second ring. The ability of both release plates to engage the second ring independently creates a desirable redundancy. The second ring translates a force of the plurality of springs to the first ring thereby engaging the friction surface of the housing to park and hold the drive shaft. When current flows through the electromagnetic coil, the first and second release plates are drawn to the face of the field cup, compress the o-rings and are frictionally linked therewith. The o-rings facilitate quiet operation of the elevator car brake.

In another embodiment, a quiet brake assembly is provided for stopping an elongated drive shaft of a motor, including a brake housing having a friction material; a disc assembly adapted and configured to be contained substantially within the housing, the disc assembly having a cavity for engaging the elongated drive shaft, when the brake assembly is in an engaged state, the disc assembly creates a housing frictional link with the friction material of the brake housing; a release plate assembly having a friction material, the disc assembly being intermediate the release plate assembly and the brake housing, when the brake assembly is in the engaged state, the release plate assembly creates a release plate frictional link with the disc assembly; and a fixed field assembly adjacent the release plate assembly, the fixed field assembly having a coil assembly for creating a magnetic field to attract the release plate assembly thereto when the brake assembly is in a disengaged state, the fixed field assembly having a plurality of biasing members to exert a force against the release plate assembly to create the housing and release plate frictional links.

In still another embodiment, a hub assembly is provided for creating frictional linking with a first adjacent component and a second adjacent component, the hub assembly including a body portion for coupling to a drive shaft, the body portion having a coupling mechanism for supporting a ring assembly to allow for axial motion thereof; and the ring assembly having a first ring sized and configured to create a first frictional link with the first adjacent component when the first adjacent component is biased against the first ring; and a second ring sized and configured to create a second frictional link with the second adjacent component when the first adjacent component is biased against the first ring.

In another embodiment, an electromagnetic having redundancy is provided for parking and holding a motor with an elongated drive shaft including a housing for mounting the electromagnetic brake to the motor, the housing having a friction surface; a disc assembly having a body portion adapted and configured to be contained within the housing, the disc assembly being axially fixed with respect to the elongated drive shaft and engaged to rotate therewith, and the disc assembly having a flange for receiving a first ring and a second ring, each ring slideably engaged to the flange for motion in an axial direction, the first ring being adjacent to the friction surface of the housing; a first release plate having a friction surface; a second release plate having a friction surface, wherein the first and second release plates are free to move in an axial direction, each release plate being adjacent to the second ring; and a fixed field cup having an electromagnetic coil for creating an magnetic field when current flows therethrough; and a plurality of springs to bias the first and second release plates against the second ring, wherein the adjustment cap varies a compression of at least two of the plurality of springs; and a plurality of o-rings in a face of the fixed field cup, wherein when no current flows through the electromagnetic coil, at least one of the release plates is biased against the second ring, the second ring translates a force of the plurality of springs to the first ring thereby engaging the friction surface of the housing to park and hold the elongated drive shaft, wherein when current flows through the electromagnetic coil, the first and second release plates are drawn to the face of the fixed field cup and compress the o-rings, wherein the o-rings facilitate quiet operation of the elevator car brake.

In yet another embodiment, an electromagnetic brake assembly is provided including a disc assembly for engaging an elongated drive shaft of a motor, the disc assembly having a body portion defining a cavity for coupling the body portion to the elongated drive shaft, the body portion having an upstanding flange which defines a plurality of holes; a pair of rings; and a plurality of pin assemblies disposed in the plurality of holes of the upstanding flange for coupling the pair of rings thereto, wherein when the body portion is coupled to the elongated drive shaft, the body portion is axially fixed and the pair of rings move freely in an axial direction.

In still another embodiment, a brake assembly is provided including a field assembly for selectively moving an adjacent plate assembly along an axis between an engaged position and a disengaged position, the field assembly having a cup having a front face and a rear face, the front face defining a channel, a plurality of bores and a plurality of counterbores; a coil secured within the channel for generating a magnetic field to attract the adjacent plate assembly towards the front face of the cup; a plurality of o-rings for cushioning a motion of the adjacent plate assembly towards the front face and for applying a first biasing force to the adjacent plate assembly away from the front face, each of the plurality of o-rings located within one of the plurality of counterbores; and a plurality of springs for applying a second biasing force to the adjacent plate assembly, each spring located within one of the plurality of bores wherein when current flows through the coil, the adjacent plate assembly overcomes the first and second biasing forces, moves closer to the front face and compresses the plurality of o-rings and when no current flows, the first and second biasing forces move the adjacent plate assembly away from the front face.

In another embodiment, an electromagnetic brake assembly is provided including a housing assembly, a release plate assembly, a field assembly and an inductive proximity sensor assembly, the inductive proximity sensor assembly having a nonmagnetic insert integral with the release plate assembly for isolating an area from magnetic flux generated by the field assembly; and an inductive gauge for generating a signal based upon a position of the non-magnetic insert.

In still another embodiment, an electromagnetic brake includes a fixed field assembly for generating a magnetic field; a biasing assembly for generating a non-linear force, the biasing assembly being integral with the field assembly; a release plate assembly adapted and configured for axial motion, the release plate being adjacent to the fixed field assembly; a disc assembly for engaging an elongated drive shaft, the disc assembly being adjacent to the release plate assembly; and a housing assembly for engaging the disc assembly, the housing assembly sized and configured to couple to the fixed field assembly such that a gap surrounds the disc assembly when the magnetic field attracts the release plate assembly against the fixed field assembly, wherein when the magnetic field degrades, the biasing assembly quietly moves the release plate assembly against the disc assembly to cause a frictional linking with the housing assembly.

These and other unique features of the system disclosed herein will become more readily apparent from the following description, the accompanying drawings and the appended claims.

BRIEF DESCRIPTION OF THE DRAWINGS

So that those having ordinary skill in the art to which the disclosed system appertains will more readily understand how to make and use the same, reference may be had to the drawings wherein:

FIG. 4B is a cross-sectional view taken along line 4B—4B of FIG. 4A;

FIG. 4C is a cross-sectional view taken along line 4C—4C of FIG. 4A;

DETAILED DESCRIPTION OF REPRESENTATIVE EMBODIMENTS

Figure 1:
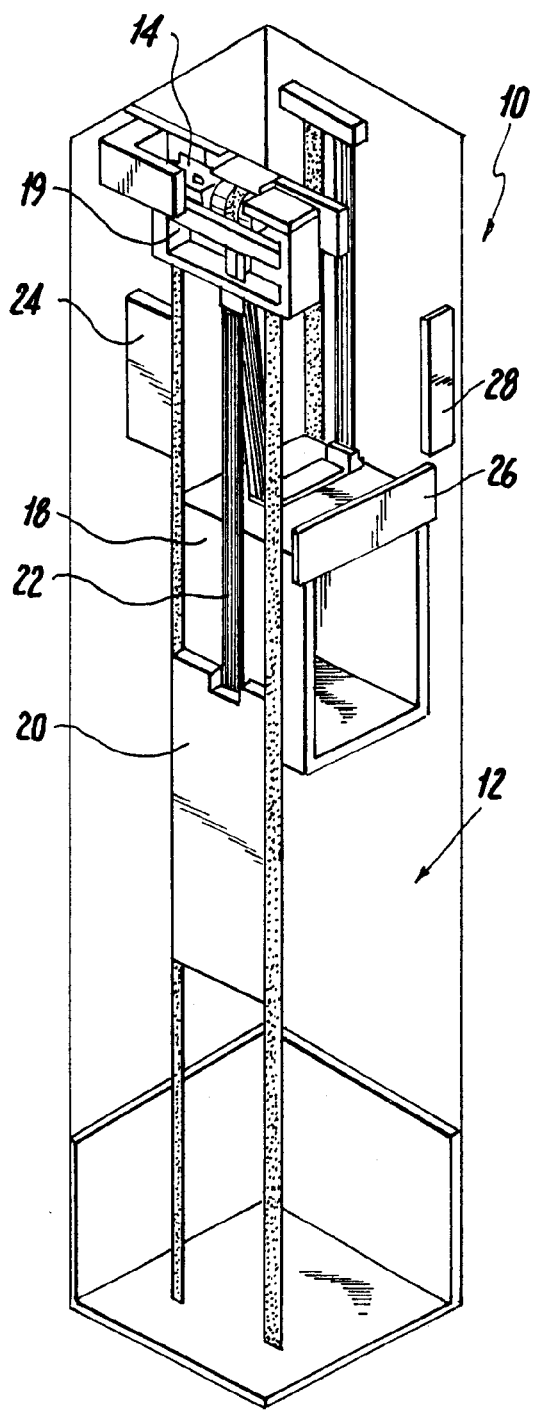
FIG. 1 is a perspective view of an elevator system having a brake assembly constructed in accordance with the subject disclosure.

The present disclosure overcomes many of the prior art problems associated with conventional brake mechanisms used in elevator systems and other applications. The present disclosure is particularly applicable to elevator brake mechanisms, although the assembly may be utilized in many circumstances, such as for controlling an escalator, in a theatre to control the curtain and move sets, in medical applications conducted in sensitive environments, in clutch applications and the like, as would be readily appreciated by those skilled in the art. The advantages, and other features of the elevator brake system disclosed herein, will become more readily apparent to those having ordinary skill in the art from the following detailed description of certain representative embodiments taken in conjunction with the drawings which set forth the representative embodiments and wherein like reference numerals indicate similar parts.

Figure 1A:
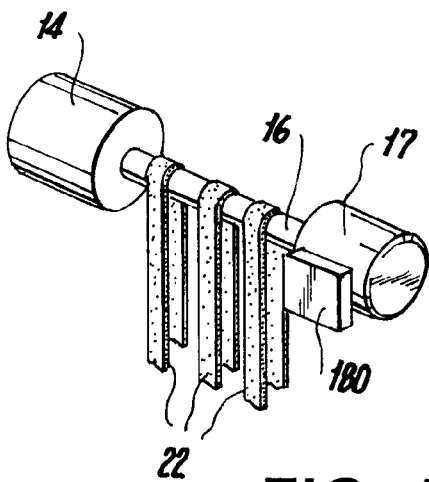
FIG. 1A is a schematic view of one representative elevator motor and shaft engaged to a brake assembly constructed in accordance with the subject disclosure.

Referring to FIGS. 1 and 1A, there is shown an environment in which the representative embodiments of the subject disclosure may be used. As illustrated, the elevator system 10 is completely enclosed within the hoistway 12 but below the roof of the building having the elevator system 10. An elevator motor 14 is mounted at the top of the hoistway 12 but below the roof of the building having the elevator system 10. A drive shaft 16 extends out of the elevator motor 14 and is supported by an outboard bearing (not shown). A mounting frame 19 supports the elevator motor 14 and the brake assembly 17. It is envisioned that the mounting frame interconnects the housing of the elevator motor 14 and the brake assembly 17 to transmit torque therebetween. The brake assembly 17 is also coupled to the drive shaft 16.

An elevator car 18 and counterweight 20 are suspended from belts 22 which wrap around the drive shaft 16 of the elevator motor 14. Thus, when the drive shaft 16 rotates, the elevator car 18 moves vertically up or down within the hoistway 12 depending upon the direction of rotation of the drive shaft 16. A controller 24 monitors and controls the elevator motor 14, the brake assembly 17 and the door controls 26. The controller 24 communicates with the brake assembly 17 via an electrical box 180 attached to the brake assembly 17. If service is required, a technician can access the components within the hoistway 12 by removing the inspection panel 28. During normal operation, the elevator motor 14 would supply the torque to move and stop the elevator car 18. However, when stopped at a landing, the brake assembly 17 would shift to the park position and hold the elevator car 18 in place.

Figure 1B:
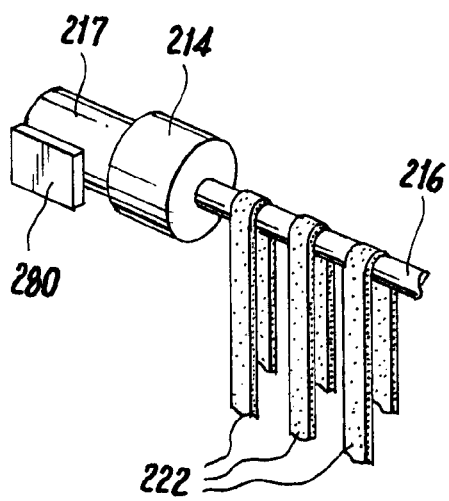
FIG. 1B is a schematic view of another representative elevator motor and shaft engaged to a brake assembly constructed in accordance with the subject disclosure.

Referring to FIG. 1B, in another representative embodiment, a brake assembly 217 mounts on one side of the elevator motor 214 and a drive shaft 216 extends out of the other side of the elevator motor 214. An outboard bearing (not shown) supports the distal end of the drive shaft 216. An elevator car and counterweight suspend from belts 222 which wrap around the drive shaft 216 of the elevator motor 214. Thus, when the drive shaft 216 rotates, the elevator car moves vertically up or down within the hoistway depending upon the direction of rotation of the drive shaft 216. An electrical box 280 interfaces between the brake assembly 217 and a controller. The controller monitors and controls the elevator motor 214, the brake assembly 217 and the door controls. During normal operation, the elevator motor 214 would supply the torque to move and stop the elevator car. However, when stopped at a landing, the brake assembly 217 would park and hold the elevator car.

Figure 2:
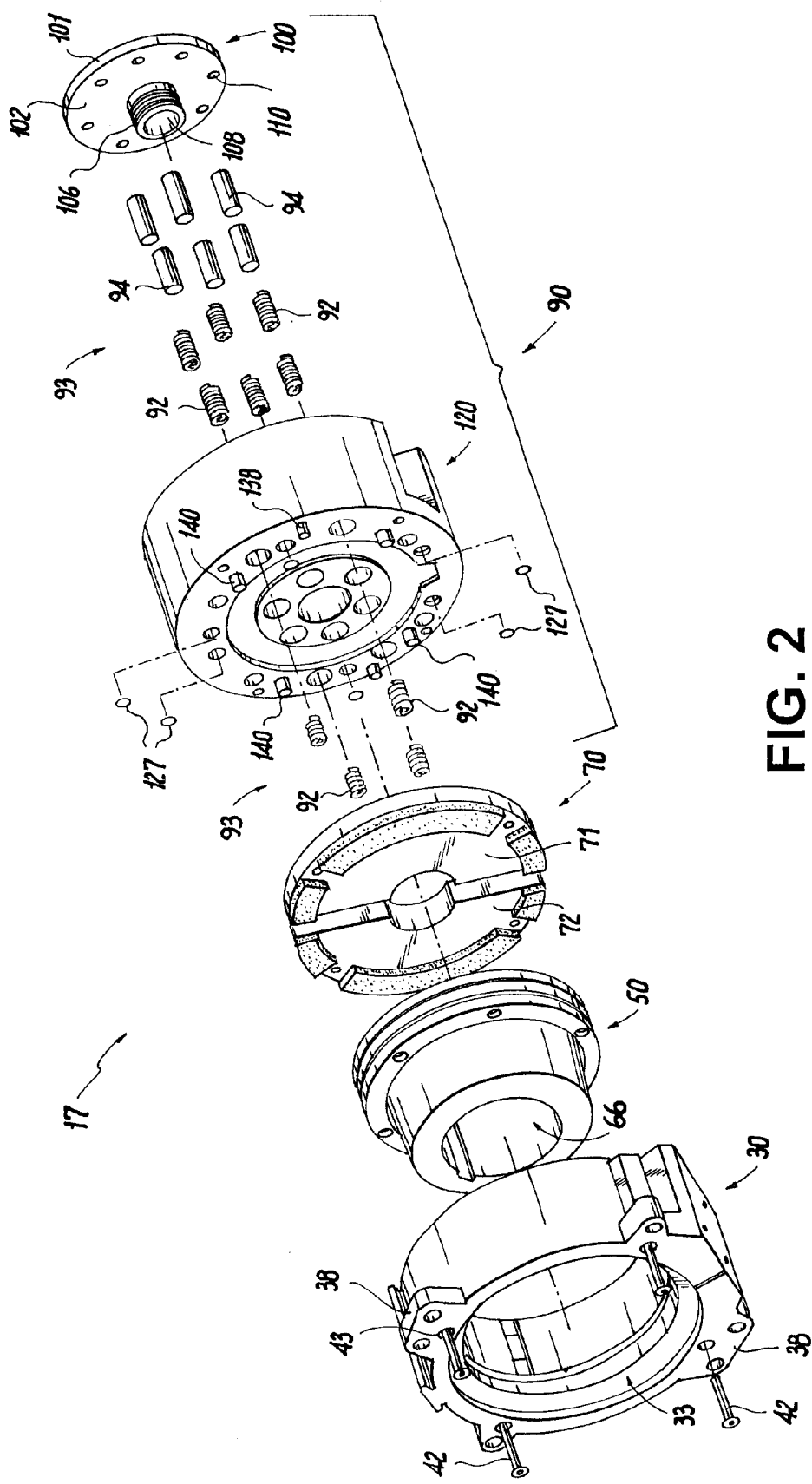
FIG. 2 is an exploded front perspective view showing the components of one representative embodiment of a brake assembly constructed in accordance with the subject disclosure.
Figure 3:
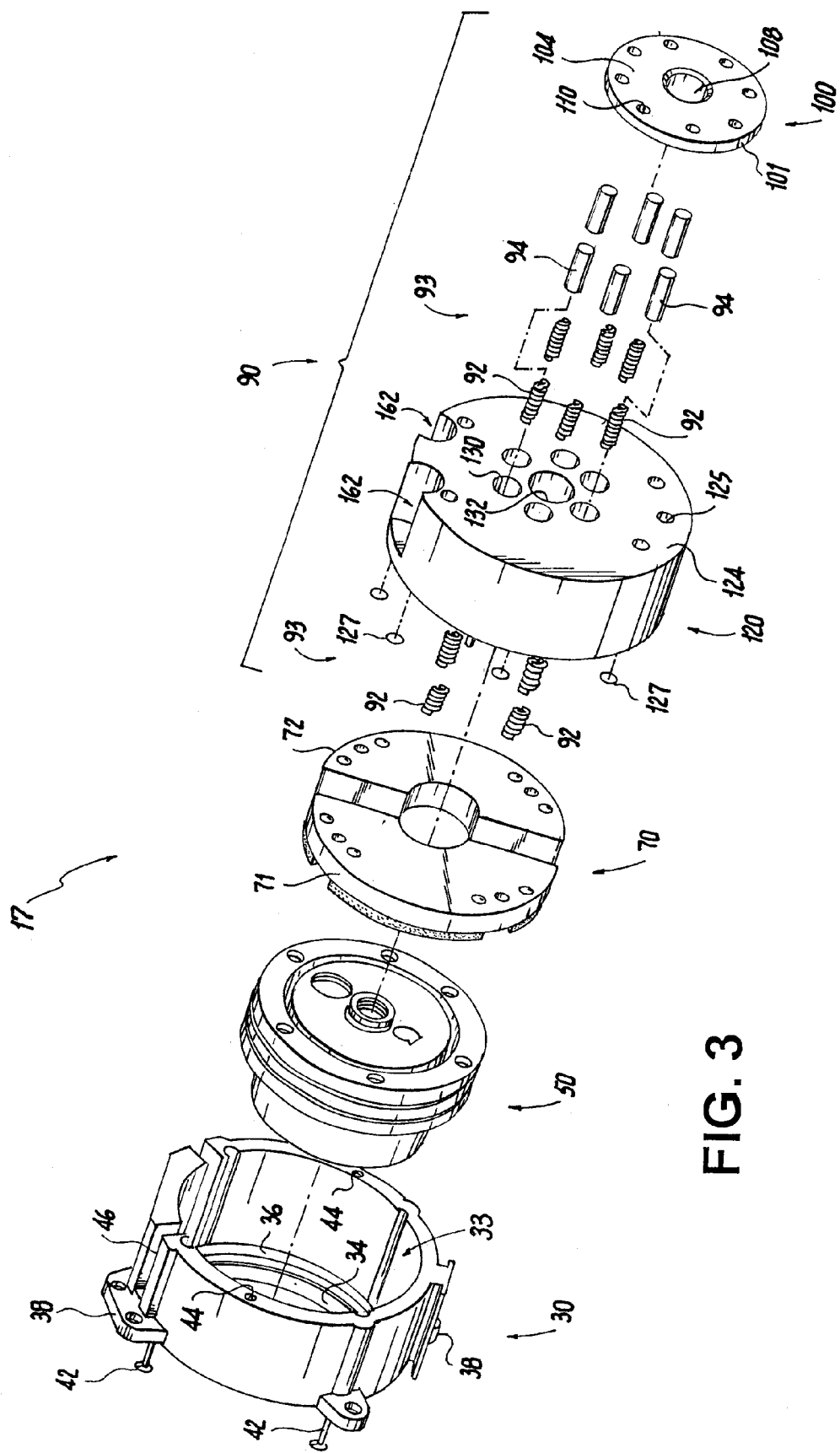
FIG. 3 an exploded rear perspective view showing the components of the brake assembly of FIG. 2.
Figure 4A:
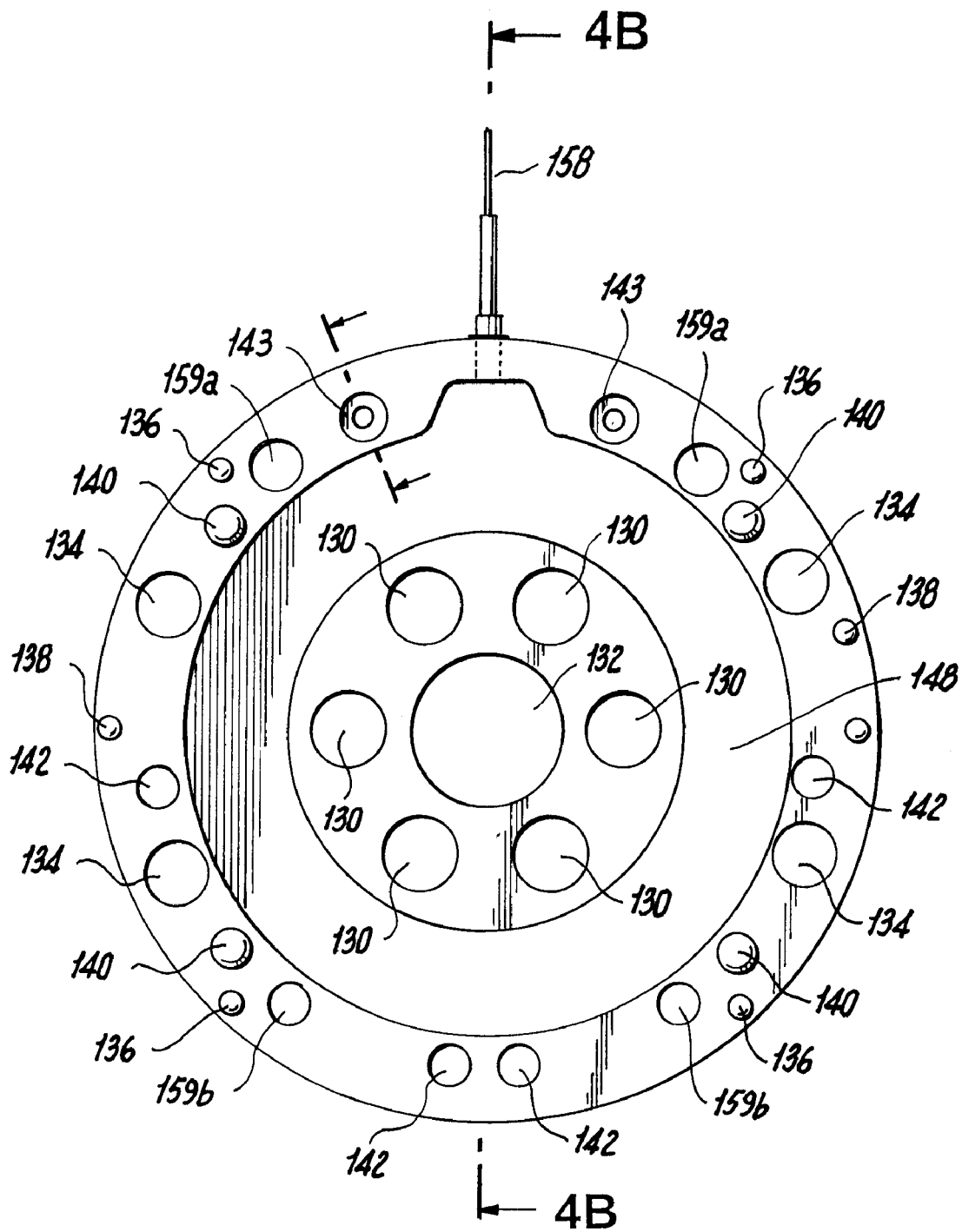
FIG. 4A is a front view of one representative embodiment of a field cup constructed in accordance with the subject disclosure.
Figure 9:
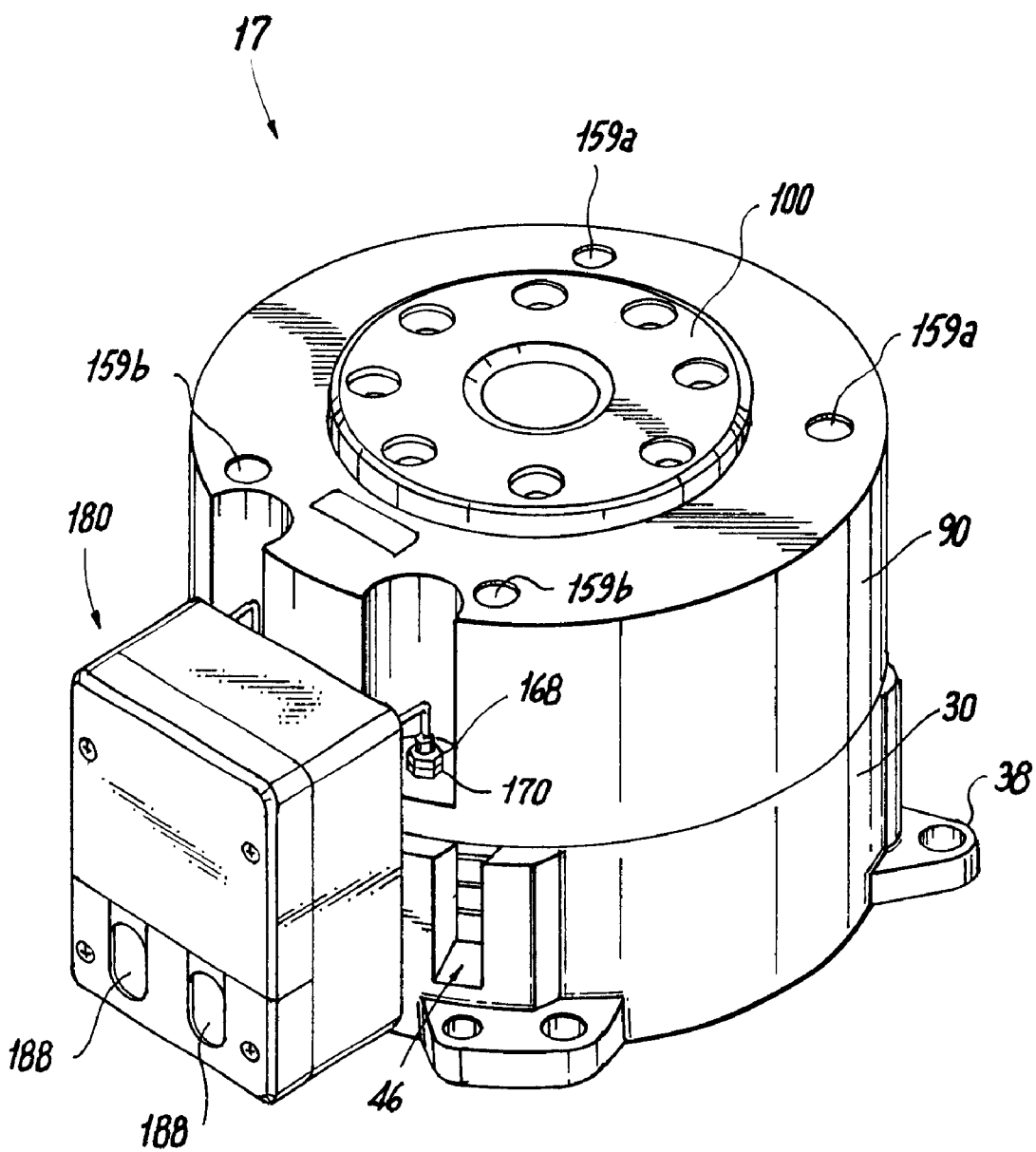
FIG. 9 is an assembled front perspective view showing the representative brake system of FIG. 8.

Referring to FIGS. 2 and 3, there is shown one representative brake assembly 17 constructed in accordance with the subject disclosure and designated generally by reference numeral 17. In general, the brake assembly 17 includes a housing assembly 30, a disc assembly 50, a release plate assembly 70, a field assembly 90 and an electrical box 180 (FIG. 9). During normal operation, the brake assembly 17 is operatively coupled to a motor housing of an elevator motor 14 and engages a drive shaft 16 of the elevator motor 14 which extends along an axis of rotation.

Referring to FIG. 9, when assembled, the representative brake assembly 17 of the present disclosure weighs approximately 45 lbs. The length and diameter are approximately 6 in. and 8 in., respectively. Despite such a compact size and small weight, the brake assembly 17 delivers more than 300 N·m of torque without generating noise above 60 dB. This combination of high torque, low weight, compact dimension and quiet operation is unique in the art of brakes and particularly for brakes used with elevator systems.

I. Field Assembly

As shown in FIGS. 2, 3, 4A, 4B, 4C, 7, 8 and 9, the field assembly 90 of the representative brake assembly 17 includes a bumper assembly 93, an adjustment cap 100 and a field cup 120. The adjustment cap 100 (FIG. 2 and 3) comprises a generally circular plate 101 having a front surface 102 and an opposing back surface 104. An upstanding cylinder 106 mounts on the front surface 102 of the adjustment cap 100 and surrounds a central aperture 108 to provide access to the disc assembly 50. The outer circumference of the upstanding cylinder 106 has threads to engage the central opening 132 of the field assembly 90. Additionally, the plate 101 has six locking holes 110 to rotationally fix the adjustment cap 100 with respect to the field assembly 90. A wrench, lever arm or the like can be temporarily inserted in the locking holes 110 to facilitate the rotational movement thereof.

The field cup 120 of the field assembly 90 comprises a front face 122 (FIG. 2) and a rear face 124 (FIG. 3). The bumper assembly 93 includes ten springs 92, four pins 94 and an elastomeric material. Preferably, the elastomeric material is integral with the front face 122 to create quiet engagement and disengagement of the release plate assembly 70. Shown in one representative embodiment, the elastomeric material is six o-rings 127. The front face 122 of the field cup 120 includes four counterbores 142 and two counterbored holes 143 (FIG. 4A) to receive the six o-rings 127. The two counterbored holes 143 perform double duty and receive proximity sensors 160 as well as o-rings 127. In another representative embodiment, the elastomeric material comprises four rubber buttons bonded to a distal end of the four pins 140. In still another representative embodiment, the elastomeric material comprises rubber patches bonded to the front face 122 of the field cup 120. It is also envisioned that the bumper assembly 93 may only be a plurality of springs or only a configuration of elastomeric material.

The field cup 120 also includes six holes 130 (FIG. 4A), each hole 130 for receiving a spring 92 and a pin 94. Holes 130 extend the axial length of the field cup 120. When assembled, the pins 94 are adjacent to the rear face 124 of the field cup 120 and the springs 92 extend partially above the front face 122 of the field cup 120. A central opening 132 (FIGS. 4A and 4B) extends axially through the field cup 120 and includes threads for engaging the adjustment cap 100 through the rear face 124. When the brake assembly 17 is assembled, the central opening 132 also provides access to the disc assembly 50.

Attaching the adjustment cap 100 to the rear face 124 of the field cup 120 retains the six pins 94 in the holes 130. The pins 94 position the springs 92 to protrude from the front face 122 of the field cup 120. A variation of the depth of insertion of the adjustment cap 100 creates a corresponding variation in the force exerted by the six springs 92 as is known to those skilled in the art. Therefore, the force applied by the brake assembly 17 varies according to the depth of the adjustment cap 100 within the field assembly 90. As a result, the force of the brake assembly 17 can be adjusted for use as required for different applications. When the proper force is achieved, a fastener is used in threaded cap hole 125 to lock the adjustment cap 100 in position relative to the field cup 120. The rear face 124 has a threaded cap hole 125 to lock the adjustment cap 100 in place with a conventional fastener. In order to rotationally lock the adjustment cap 100, the adjustment cap 100 is rotated until one of its locking holes 110 aligns with the threaded cap hole 125 and a fastener is engaged therein. In one presently preferred embodiment, the fastener includes a tamper-proof component to prevent adjustment by unauthorized personnel.

The front face 122 of the field cup 120 also comprises four bores 134 (FIG. 4A) to receive four springs 92. Each bore 134 is shallower in depth than the height of the spring 92 in order to fix the spring 92 in place while still allowing a portion of the spring 92 to extend out of the bore 134. Thus, the four springs 92 within the bores 134 also apply force to bias the release plate assembly 70.

Figure 5A:
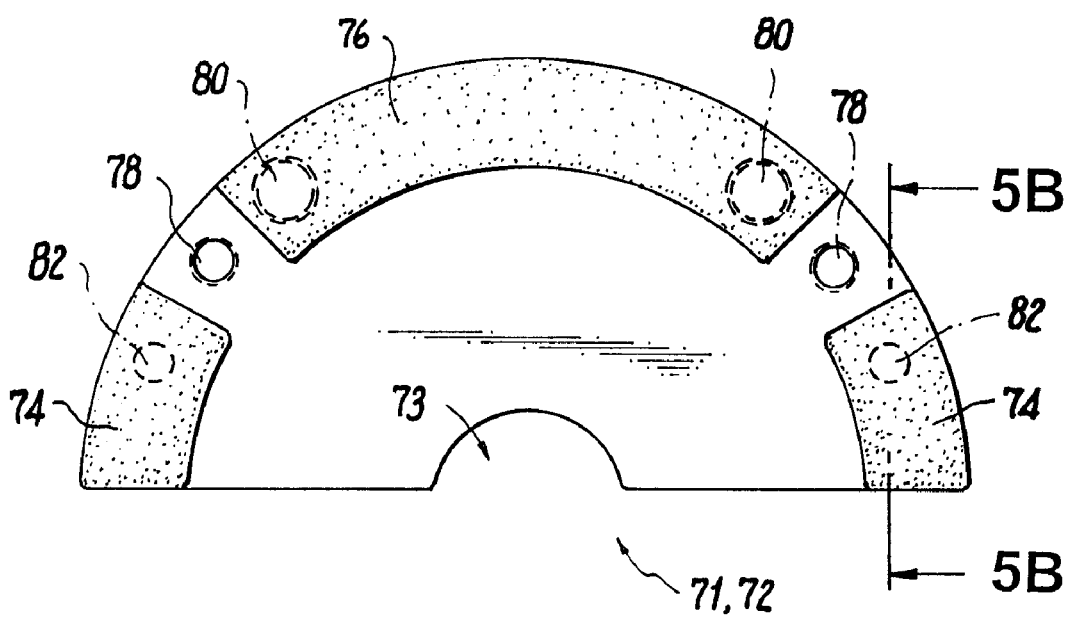
FIG. 5A is a front perspective view of one representative embodiment of a release plate constructed in accordance with the subject disclosure.

The front face 122 of the field cup 120 further includes four tapped holes 136 (FIGS. 2 and 4A) for bolting the field cup 120 onto the housing assembly 30. Additionally, two housing pins 138 are located on the front face 122 for rotationally fixing the field cup 120 assembly to the housing assembly 30. The two housing pins 138 are located asymmetrically to prevent misalignment of the field cup 120 assembly during assembly of the brake assembly 17. Thus, the shear forces acting on the field cup 120 are transmitted by the housing pins 138 to the housing assembly 30. The front face 122 of the field cup 120 also includes four pins 140 to engage the bushing bores 80 (FIG. 5A) of the release plate assembly 70. Thus, the shearing forces between the release plate assembly 70 and the field cup 120 are transmitted between the pins 140 and bushing bore 80.

The field cup 120 is presently preferably constructed of steel or other ferromagnetic material in order to conduct magnetic flux. The magnetic flux generated by the field assembly 90 is at least sufficient to attract the release plate assembly 70 and to overcome the bias of the ten springs 92 and the o-rings 127. The field cup 120 includes a coil assembly 150 (FIG. 4B) which generates the magnetic field used to compress the ten springs 92 and the o-rings 127 during operation.

The coil assembly 150 presently preferably includes a coil 152, compound 154, grommet 156, and electrical leads 158. The electrical leads 158 pass current through the coil 152 to create the magnetic field. The grommet 156 provides strain relief for the electrical leads 158. The front face 122 of the field cup 120 forms a channel 148 (FIG. 4A) for receiving the coil assembly 150. The coil 152 is presently preferably bonded in place by the compound 154 to prevent moisture from corroding the coil 152. Further, the compound 154 is presently preferably thermally conductive to transfer heat away from the coil. An exemplary compound 154 is available from ResTech/Biwax of 6120 E. 58th Avenue, Commerce City, Colo. 80022 as part number ResTech® 99772. Presently preferably, the compound 154 completely covers the coil 152 yet a gap 157 (FIG. 4B) remains between the coil assembly 150 and the front face 122. It is presently preferred that no cracks or voids in the compound 154 reach the coil 152 because such cracks or voids would detrimentally affect isolation performance of the compound 154 and, thereby, reduce the life of the coil assembly 150. In another representative embodiment, a diode in parallel with the coil 152 is potted by the compound 154 within the channel 148.

Figure 8:
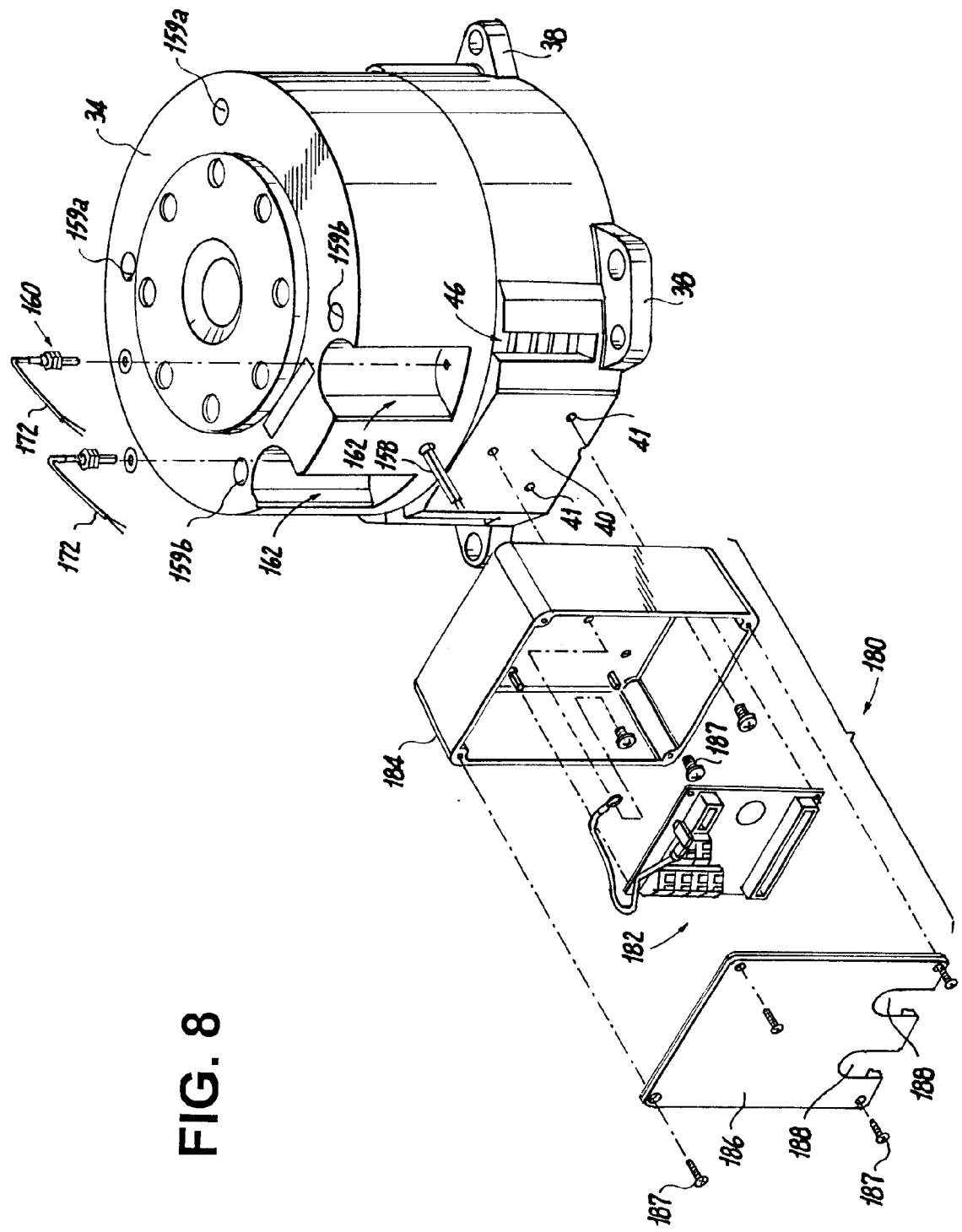
FIG. 8 is an exploded front perspective view showing the components of one representative embodiment of a brake system constructed in accordance with the subject disclosure.

The field assembly 90 also includes proximity sensors 160 (FIGS. 8 and 9). The proximity sensors 160 provide a signal to the electronic control mechanism indicating the status of the release plate assembly 70. The rear face 124 of the field cup 120 includes cut-outs 162 to insert proximity sensors 160 (FIGS. 3, 4B, 8 and 9). In a representative presently preferred embodiment, the proximity sensors 160 are inductive gauges which indicate a position of the release plate assembly 70 without a moving part. For example, Namur type gauges can be used as proximity sensors 160 and are available from Pepperel and Fuchs, 1600 Enterprise Parkway, Twinsburg, Ohio 44087-2245 as model number NJO.8-5GM-N.

In order to prevent the magnetic flux from interfering with the inductive gauges, the holes 143 of the front face 122 which receive the inductive gauges are press fit with a non-magnetic stainless steel insert 164 (FIG. 4B). It is envisioned that the insert 164 is press fit into the hole such that enough gap 166 remains to receive an o-ring 127. In one representative embodiment, the inductive gauge screws into the insert 164 to allow the depth to be set with a lock nut 168 and a jam nut 170 (FIGS. 8 and 9). The proximity sensors 160 have electrical leads for conducting the signals associated therewith.

II. Release Plate Assembly

As shown in FIGS. 2, 3, 5A and 5B, the release plate assembly 70 includes two substantially identical release plates 71, 72 that are presently preferably interchangeably with each other. The release plate assembly 70 is free to move axially between the front face 122 of the field cup 120 and the disc assembly 50. The release plates 71, 72 are constructed of steel or other ferromagnetic material in order to interact with magnetic flux as is known in the art. When the brake assembly 17 is engaged, the release plate assembly 70 is frictionally linked to the disc assembly 50. When the brake assembly 17 is disengaged, the release plate assembly 70 is positioned against the front face 122 of the field cup 120.

The release plates 71, 72 are substantially hemispheric plates which would combine to form a circle but for a hemispheric hollow 73. The hemispheric hollow 73 creates an axially centered opening to allow access to the disc assembly 50 through the release plate 72. The release plates 71, 72 have two short segments 74 and a long segment 76 bonded thereon. Preferably, the segments 74, 76 of the release plates 71, 72 are composed of a friction material. The segments 74, 76 of the release plates 71, 72 prevent a metal to metal contact by the release plates 71, 72 with the disc assembly 50. Thus, the noise and wear characteristics are improved over metal to metal contact. Presently preferably, the noise level during operation of the brake assembly 17 is at or below about 60 dBA. Further, the friction material of the segments 74, 76 of the release plates 71, 72 creates a higher coefficient of friction for increased efficiency during engagement.

In one presently preferred embodiment, the arcuate length of the short segments 74 is approximately 30 degrees and the arcuate length of long segment 76 is approximately 90 degrees. Two tapped holes 78 for manually capturing the release plates 71, 72 are located between the short segment 74 and the long segment 76. The tapped holes 78 are presently preferably threaded and free from contamination to facilitate capturing manual release screws (not shown).

Figure 5B:
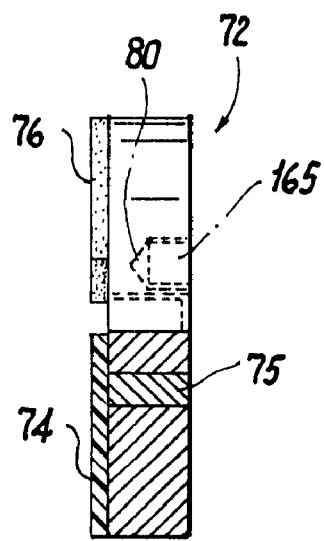
FIG. 5B is a cross-sectional view taken along line 5B—5B of FIG. 5A.
Figure 6A:
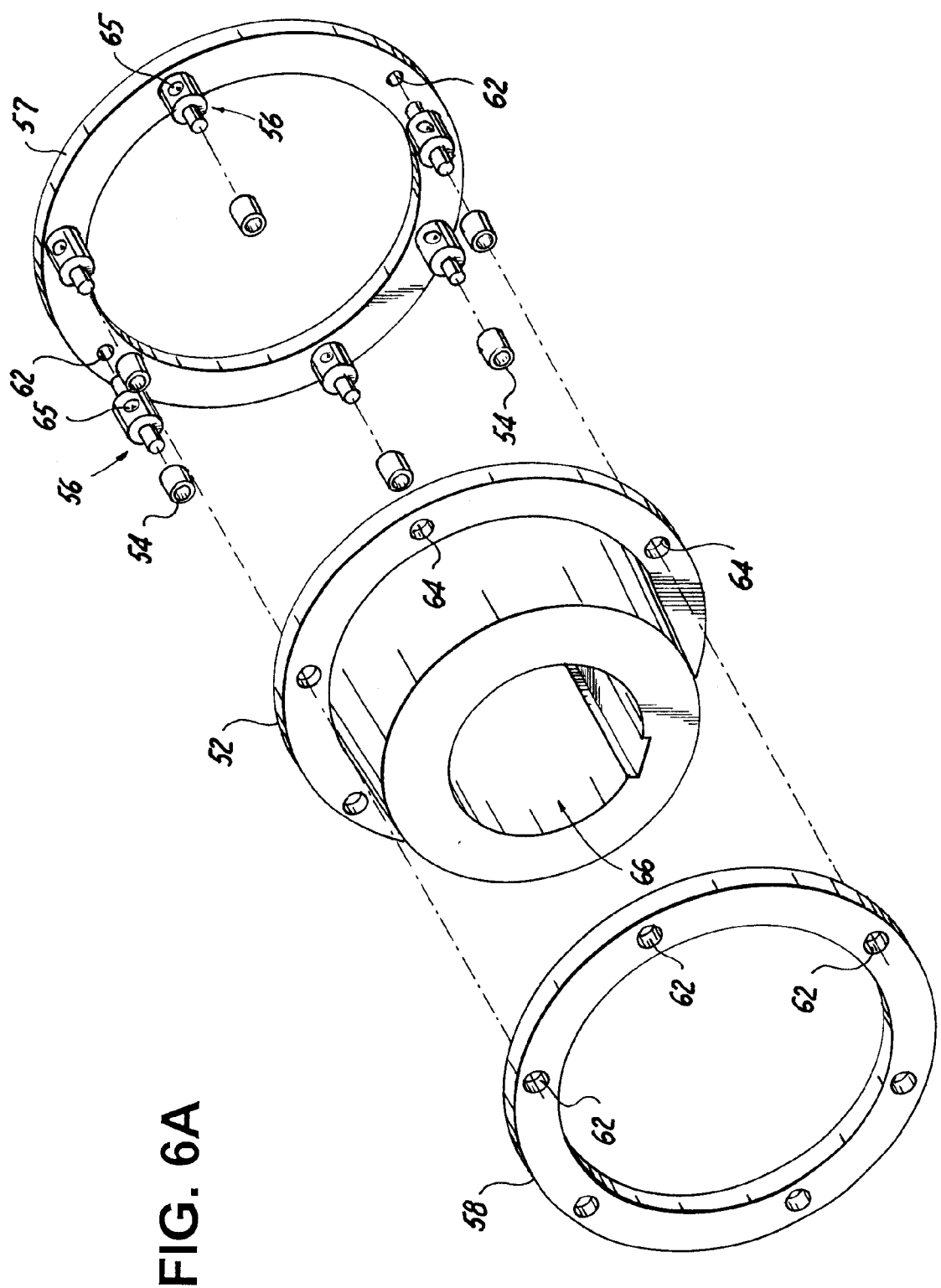
FIG. 6A is an exploded front perspective view showing the components of one representative embodiment of a disc assembly constructed in accordance with the subject disclosure.
Figure 6C:
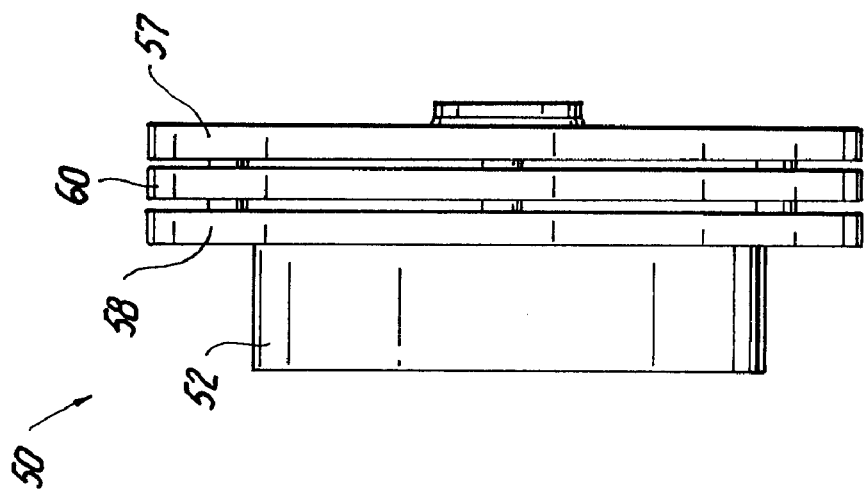
FIGS. 6B and 6C are, respectively, a front view and a side view of the disc assembly of FIG. 6A.
Figure 6B:
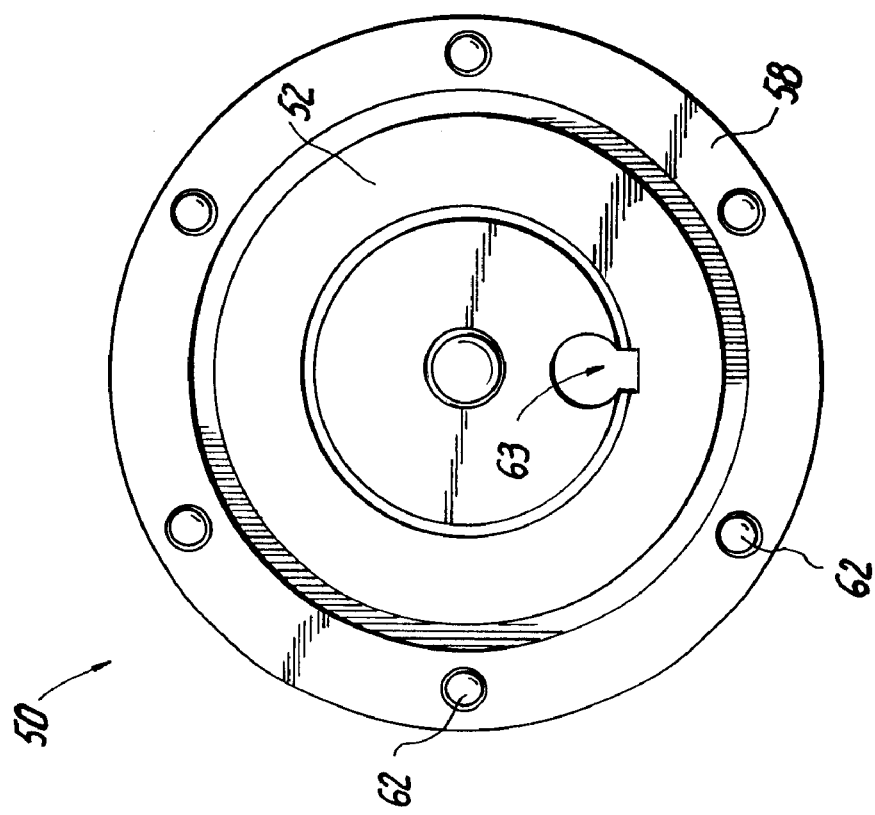
Figure 6D:
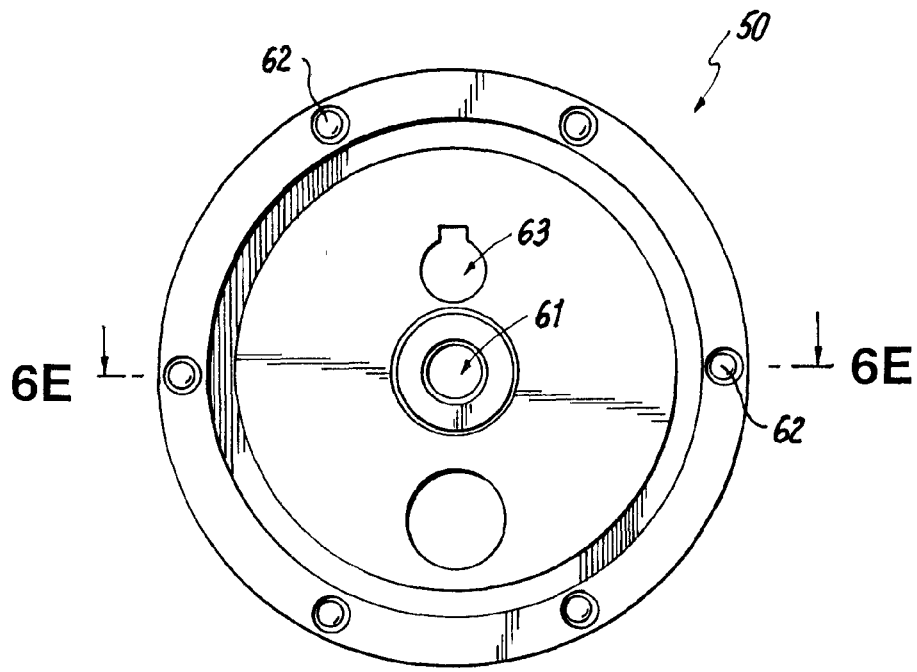
FIG. 6D is a rear view of the disc assembly of FIG. 6A.
Figure 6E:
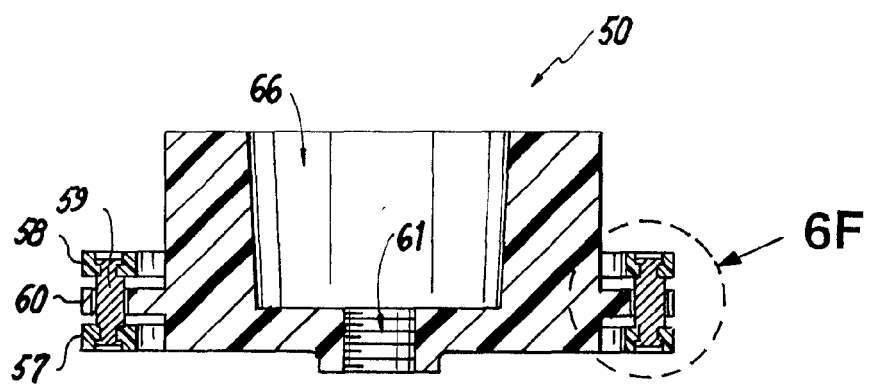
FIG. 6E is a cross-sectional view taken along line 6E—6E of FIG. 6D.
Figure 6F:
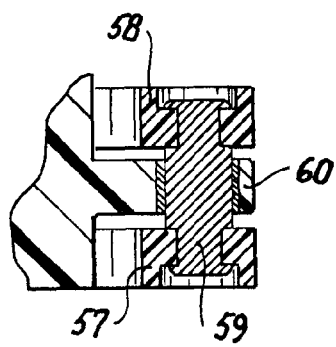
FIG. 6F is an enlarged view of a localized area 6F of FIG. 6E

Adjacent to the tapped holes 78 are bushing bores 80 and plug bores 82. A non-magnetic insert 75 is press fit and bonded into the plug bore 82. In a representative embodiment, the insert is presently preferably non-magnetic stainless steel. The purpose of the non-magnetic insert 75 is to break up the magnetic field in a sufficiently large area to prevent interference by the magnetic field with the operation of the inductive proximity sensors 160. A bushing 165, shown in phantom lines on FIG. 5B, is press fit into the bushing bore 80 to receive the four pins 140 of the field assembly 90. The bushing 165 within the bushing bore 80 eliminates a metal to metal contact between the pins 140 and the bushing bore 80. Further, the bushings 165 within the bushing bores 80 provide lubricity to facilitate the axial motion of the release plates 71, 72. In a presently preferred embodiment, the bushings 165 within the bushing bores 80 are Iglide® bearings available from Igus® Inc., P.O. Box 14349, E. Providence, R.I. 02914.

III. Disc Assembly

As shown in FIGS. 2, 3, 6A–F and 7, the disc assembly 50 is axially fixed between the release plate assembly 70 and the housing assembly 30. The disc assembly 50 mounts to the drive shaft 16 and rotates therewith when the elevator car 18 is in motion. When the brake assembly 17 engages, the disc assembly 50 frictionally links with the release plate assembly 70 and the housing assembly 30 to arrest the drive shaft 16.

The disc assembly 50 (FIG. 6A) presently preferably includes a body portion 52, six bushings 54, six anti-rattle pin assemblies 56, a first ring 57 and a second ring 58. The body portion 52 has a flange 60 with six holes 64 for coupling to the two rings 57, 58. The two rings 57, 58 are fixed in relation to one another, however, the two rings 57, 58 are free to move axially within the holes 64 of the flange 60.

The two rings 57, 58 of the disc assembly 50 are presently preferably substantially identical to allow for easy manufacture of parts and assembly. Each of the two rings 57, 58 has six holes 62 corresponding to the six holes 64 in the flange 60. The flange holes 64 are through holes and the ring holes 62 are countersunk (FIG. 6F) to prevent interference with the release plate assembly 70 and housing assembly 30, respectively. To assemble the disc assembly 50, the bushings 54 are press fit into the holes 64 of the flange 60. In one presently preferred embodiment, the bushings 54 are Iglide® bearings. The anti-rattle pin assemblies 56 insert within the bushings 54 which provide lubrication for the axial motion of the rings 57, 58. The anti-rattle pin assemblies 56 include a fastener 59 to attach the two rings 57, 58 together about the flange 60. In one representative embodiment, the fastener 59 is a rivet. The anti-rattle pin assemblies 56 also presently preferably include a spring-loaded ball 65 which contacts the bushings 54 when the brake assembly 17 is disengaged.

The body portion 52 of the disc assembly 50 presently preferably has a chamfered cavity 66. The chamfered cavity 66 presently preferably includes a taper 55 (FIG. 7) to create a press fit engagement with the drive shaft 16 of the elevator motor 14. The body portion 52 presently preferably includes a threaded aperture 61 to receive a bolt 67 and washer 68, shown in phantom line on FIG. 7. To couple the disc assembly 50 to the drive shaft 16, the bolt 67 is screwed into the drive shaft 16. As the bolt 67 forces the body portion 52 onto the drive shaft 16, a press-fit engagement occurs because of the taper 55 of the chamfered cavity 66. Still further, the body portion 52 presently preferably includes a key way 63 which mirrors a key way in the drive shaft 16 of the elevator motor 14. A key (not shown) couples the key way 63 of the body portion 52 to the key way 63 in the drive shaft 16 to provide a redundant mechanism for transmitting torque between the disc assembly 50 and the drive shaft 16.

In another embodiment, the brake assembly operates below 65 dBA.

IV. Housing Assembly

As shown in FIGS. 2, 3, 7, 8 and 9, the housing assembly 30 interfaces with the elevator motor 14, supports an electrical box 180 and couples to the field assembly 90. Presently tabs 38 on the front side of the housing assembly 30 are used to mount the housing assembly 30 to the elevator motor 14. A planar portion 40 of the outer circumference of the housing assembly 30 defines three tapped holes 41 for engaging the electrical box 180. Four bolts 42 pass through holes 43 to engage the tapped holes 136 of the field assembly 90. Additionally, two bores 44 in the circumference of the housing assembly 30 receive the two housing pins 138 of the field assembly 90. Thus, the torque therethrough is not transmitted by the threaded bolts 42 but by the housing pins 138.

The housing assembly 30 is presently preferably a generally cylindrical cup with a rearward opening recess 33. The rearward opening recess 33 is defined by an inner radius of the housing assembly 30 and a bottom portion 34. A friction material 36 is bonded to the bottom portion. Presently preferably, the friction material 36 comprises four 90 degree segments shaped similarly to the long segments 76 of the release plate assembly 70 to allow for ease of manufacture and assembly. The friction material 36 on the housing prevents metal to metal contact with the first ring 57 of the disc assembly 50.

Figure 7:
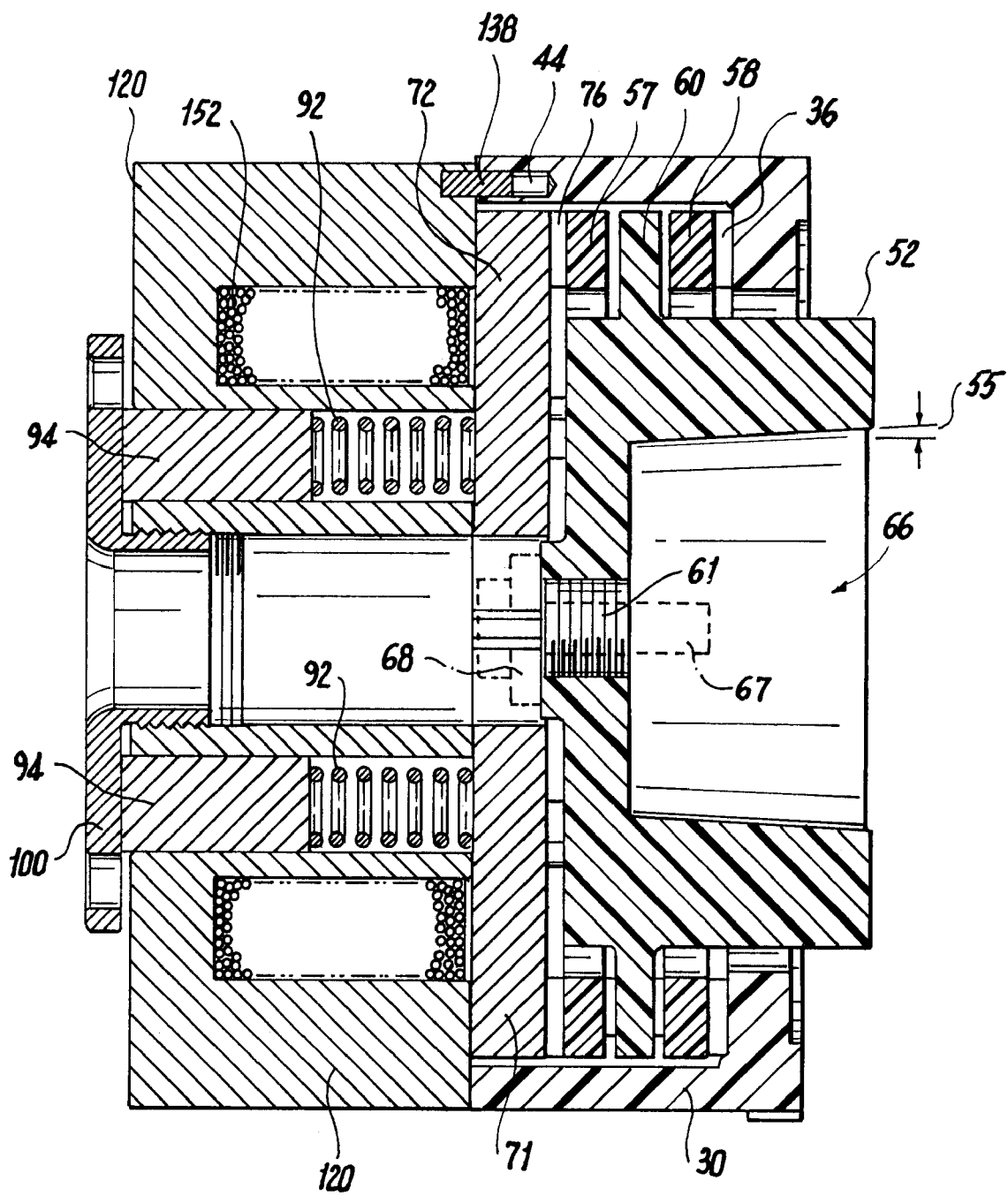
FIG. 7 is a cross-sectional view of one representative embodiment of a brake assembly, in the power off state, constructed in accordance with the subject disclosure.

When assembled, the disc assembly 50 and the release plate assembly 70 are contained within the housing assembly 30 and the field assembly 90 (FIGS. 7 and 9). The cavity 66 of the disc assembly 50 partially extends through the recess 33 of the housing assembly 30 to couple to the drive shaft 16 of the elevator motor 14. Thus, contamination is minimized even under undesirably dirty operating conditions as is typical within new building construction. In one representative embodiment, when the body portion 52 is locked to the drive shaft 16 and the release plate assembly 70 is against the field assembly 90 to allow for rotation of the disc assembly 50, the air gaps from the second ring 58 to the friction material of the release plates 71, 72 and from the first ring 57 to the friction material 36 of the housing assembly 30 is nominally about 0.008 inches. The housing assembly 30 and the field assembly 90 engage to set such air gaps. Thus, the separate plate with stand-offs of the prior art is not required. A smaller the air gap results in quieter operation. However, the air gap cannot be so small as to create drag when the disc assembly 50 rotates. Further, the substantial concealment of the moving parts within the housing assembly 30 and the field assembly 90 provides additional sound dampening of the noise generated by the operation of the brake assembly 17.

Notwithstanding the protection against contamination, the alignment of the disc assembly 50 can still be verified without disassembly. Slots 46 (FIGS. 8 and 9) provides access to a portion of the disc assembly 50 such that contaminants will typically not enter the brake assembly 17. The slots 46 allow a technician to insert a feeler gauge between the housing assembly 30, disc assembly 50 and release plate assembly 70 to determine if the alignment is within specification.

Referring to FIGS. 1A and 7, the brake assembly 17 is shown in a static disengaged state, i.e. no current passing through the coil 152. The adjustment cap 100 forces the pins 94 through the bores 134. The depth at which the adjustment cap 100 forces the pins 94 into the bores 134 varies the compression and, thus the force, of the six springs 92 therein. The ten springs 92 and six o-rings 127 exert pressure on the release plates 71, 72 to bias the segments 74, 76 thereon against the disc assembly 50. The pressure from the release plates 71, 72 forces the first ring 57 of the disc assembly 50 to move the second ring 58 towards the housing assembly 30. The friction material 36 on the housing assembly 30 engages the second ring 58 to park and hold the disc assembly 50 and thereby the drive shaft 16 of the elevator motor 14 in place.

V. Electrical Box

As shown in FIGS. 1A, 8 and 9, an electrical box 180 is mounted to the housing assembly 30 with conventional fasteners 187. The electrical box 180 interfaces with the controller 24, receives the electrical leads from the proximity sensors 160 and provides current to the electrical leads 158 of the coil 152 of the field assembly 90. The electrical box 180 presently preferably includes a circuit board 182, a container 184 to house the circuit board 182 and a lid 186 to close the container 184.

The container 184 may be made from molded plastic, machined aluminum or the like. The lid 186 is retained in place by conventional fasteners 187. Openings 188 in the lid 186 provide access to connect the circuit board 182 to the controller 24 of the elevator system 10. The controller 24 sends and receives signals with the circuit board 182. The signals include the output of the proximity sensors 160 and the input for the electromagnetic coil 152 of the field assembly 90. In another representative embodiment, the functionality of the electrical box 180 is incorporated in the controller 24.

The circuit board 182 presently preferably consists of four functional blocks. The four functional blocks are a logic power supply circuit, a proximity sensor circuit, a relay circuit and a coil power circuit. The logic power supply circuit provides power to the components on the circuit board 182. Preferably, a linear regulator in the controller 24 supplies power to the logic power circuit. The proximity sensor circuit receives the output of the proximity sensors 160. The proximity sensors 160 output a voltage which varies with the position of the insert 164 of the release plate assembly 70.

The proximity sensor circuit has comparators for converting the voltage from the proximity sensors 160 to a signal which indicates whether each release plate 72 is against the front face 122 or the first ring 57. The signal indicating the position of the release plates 71, 72 is output to the controller 24 by the circuit board 182. In a representative embodiment, the comparators operate over a wide temperature range. For example, the operating temperature range is from −55 degrees C. to 125 degrees C.

The relay circuit conditions the output from the proximity sensors 160 for use by the controller 24. In particular, the relay circuit converts the analog proximity sensor output to a digital signal. The relay circuit uses solid state relays with logic which insures the release plates 71, 72 have arrived at the new position before the output signal switches. Further, the relay circuit includes a delay circuit which prevents a subsequent state change of the proximity sensor signal until a predefined time period elapses. The coil power circuit provides a direct connection to enable a through connection of power from the controller 24 to the coil 152 of the field assembly 90. Preferably, a true physical barrier exists on the circuit board 182 to isolate the coil power circuit from the other circuitry.

VI. Operation

In normal operation, the elevator motor 14 in cooperation with the brake 20 assembly 17 moves and stops the elevator car 18. During travel of the elevator car, the brake assembly 17 is disengaged to allow the drive shaft 16 of the elevator motor 14 to rotate and cause such movement. The disc assembly 50 rotates with the drive shaft 16. The rotation of the disc assembly 50 acts upon the first ring 57 and the second ring 58 such that they gravitate to a position free from interference with the release plate assembly 70 and the housing assembly 30, respectively. The proximity sensors 160 verify the position of the release plate assembly 70 and provide such signals to the controller 24.

To disengage the brake assembly 17, the controller 24 sends current through the coil 152 of the field assembly 90. The current passing through the coil 152 creates a magnetic field having flux lines. Generally, the flux lines radiate out from the field cup 120, cross through the release plates 71, 72 and return to the field assembly 90 to complete a circuit. The magnetic field attracts the release plate assembly 70 towards the front face 122 of the field cup 120. In effect, the field cup 120 acts as a powerful magnet pulling the release plate assembly 70 against its front face 122 despite the force of the springs 92 and the o-rings 127 in the face 122 of the field cup 120. The springs 92 and the o-rings 127 become compressed.

As the compression of the o-rings 127 increases, the volume of the counterbores 142, 143 becomes filled and the o-rings 127 can no longer deform. As a result, the force exerted by the o-rings 127 greatly increases just before contact between the release plates 71, 72 and the front face 122 occurs. As a result, the last portion of the distance the release plates 71, 72 travel towards the front face 122 occurs gradually. The gradual motion creates a quiet engagement eventhough a metal to metal contact occurs. The elimination of an air gap between the release plate assembly 70 and field cup 120 allows the flux generated by the coil 152 to generate maximum holding power on the release plates 71, 72. In another representative embodiment, the o-rings 127 of the field cup 120 prevent a metal to metal contact to minimize the noise generated when the release plates 71, 72 are pulled against the front face 122 of the field cup 120.

During movement of the release plate assembly 70, the proximity sensors 160 verify the position of the release plate assembly 70 and provide such signals to the controller 24. If the controller 24 does not receive the proper signals from the proximity sensors 160, then the controller 24 will recognize the error condition and take appropriate action. Appropriate action may be delivery of an electronic message via modem (not shown) to service personnel.

When the release plate assembly 70 engages the field assembly 90, a static condition is achieved. Under this static condition, a gap is formed between the release plates 71, 72 and the disc assembly 50. As a result, when the disc assembly 50 rotates with the drive shaft 16, the first ring 57 and the second ring 58 gravitate to a position without mechanical interference. Generally, the second ring 58 will not contact the housing assembly 30 and the first ring 57 will not contact the release plate assembly 70.

Still referring to FIG. 7, upon arrival at a desired landing or floor, the elevator motor 14 stops the elevator car 18 and the brake assembly 17 engages to park and hold the elevator car 18. To engage the brake assembly 17, the control system stops the flow of current to the coil 152 of field assembly 90. Preferably, a diode (not shown) within the controller 24 creates a gradual shutdown of the magnetic field generated by the field assembly 90. It is envisioned the diode is in parallel with the coil and can be located in several location such as within the compound 154 of the coil assembly 150, on the circuit board 180 or the like. Notwithstanding the gradual magnetic field degradation, the o-rings 127 quickly overcome the force of the magnetic field because of the greatly increased force resulting from the over compression condition of the o-rings 127.

Once the o-rings 127 push the release plates 71, 72 away from the front face 122, an air gap is created between the release plates 71, 72 and the front face 122. As a result, the holding power of the magnetic field decreases greatly. As the air gap increases, the o-rings 127 no longer fill the volume of the counterbores 142, 143 and the over compression condition reverses. Thus, the o-ring 127 force drops off significantly almost to the level of attraction of the degrading magnetic field. At this point, the balance between attractive force of the degrading magnetic field, the substantially linear repulsive force exerted by the springs 92 and the exponentially reduced repulsive force exerted by the o-rings 127 generates a smooth motion of the release plates 71, 72 towards the disc assembly 50. As the release plates 71, 72 move away from the front face 122 of the field assembly 90, the compression and thereby the force of the o-rings 127 is minimal. The o-rings 127 and the springs 92 move the release plates 71, 72 towards the disc assembly 50. Further, the magnetic field continues to degrade because of the increased distance from the front face 122 of the field assembly 90 and the lack of current to the coil 152.

Still referring to FIG. 7, the magnetic field from the coil 152 becomes nonexistent and the springs 92 and the o-rings 127 quietly bias the release plates 71, 72 against the disc assembly 50. Eventually, the segments 74, 76 on the release plates 71, 72 engage the first ring 57 to create a frictional link therewith. The release plates 71, 72 move the first ring 57 of the disc assembly 50 causing the second ring 58 to move and frictionally engage the housing assembly 30. The frictional links between the second ring 58 and the friction material 36 of the housing assembly 30 as well as the first ring 57 and the release plates 71, 72 prevent the disc assembly 50 and thereby the drive shaft 16 of the elevator motor 14 from rotating. Thus, each release plate 71, 72 brakes the disc assembly 50 to accomplish a redundant park and hold mechanism for the elevator motor 14 of the elevator system 10.

During an emergency situation such as a power outage or free-fall condition, the brake assembly 17 engages. It is envisioned that the brake assembly 17 will stop and hold an otherwise uncontrolled elevator car 18 with a full or empty payload. To perform an emergency braking, the controller 24 shuts off the current to the electromagnetic coil 152. The o-rings 127 and springs 92 push the release plates 71, 72 towards the disc assembly 50 as the magnetic field weakens. The o-rings 127 and the springs 92 bias the release plates 71, 72 towards the disc assembly 50 as the magnetic field eventually becomes non-existent. The segments 74, 76 of the release plates 71, 72 engage the first ring 57 of the disc assembly 50 to create a frictional link therebetween. It is envisioned that the disc assembly 50 may be rotating when the release plates 71, 72 make contact. The release plates 71, 72 engage the first ring 57 of the disc assembly 50 to push it towards the housing assembly 30 and, thereby, the second ring 58 moves and engages the friction material 36 of the housing assembly 30. The force of the springs 92 and o-rings 127 will create frictional linking between the release plates 71, 72 and the first ring 57 as well as the second ring 58 and the housing assembly 30. The frictional linking is sufficient to stop the rotation of the disc assembly 50, thus the drive shaft 16 of the elevator motor 14 will stop rotating and the elevator car 18 will be parked and held in place. Preferably, the shearing forces created by braking the disc assembly 50 are transmitted through the bushing bores 80 of the release plates 71, 72 to the housing pins 138 of the field assembly 90 to the housing assembly 30 to the elevator motor housing.

The release plate assembly 70 comprises two release plates 71, 72 for redundancy of braking power. For example, a release plate 72 may become bound due to contamination within the housing assembly 30. Under such circumstances, the non-bound release plate 71 is still biased by five springs 92 and three o-rings 127 to move it against the first ring 57 to engage therewith. The engagement with the first ring 57 forces the second ring 58 against the housing assembly 30 where the second ring 58 engages the friction material thereon. The frictional linking between the non-bound release plate 71, the disc assembly 50 and the housing assembly 30 parks and holds the drive shaft 16 of the elevator motor 14.

For testing, the ability of the release plates 71, 72 to park and hold the elevator car 18 needs to be independently tested. In order to perform individual testing of the release plates 71, 72, a technician inserts two test screws (not shown) into manual test holes 159A, 159B to engage one release plate at a time, respectively. For example, in manual test hole 159A, the two test screws threadably engage the tapped holes 78 of the release plate 72. As the two test screws are tightened, the release plate 72 overcomes the bias of the springs 92 and is drawn against the front face 122 of the field cup 120. Therefore, only one release plate 71 can engage the disc assembly 50 and the ability thereof to park and hold the drive shaft 16 of the elevator motor 14 is independently tested. Similarly, the two test screws are utilized only in the manual test holes 159B to verify the ability of release plate 72 to park and hold the drive shaft 16 independently.

While the subject disclosure has been described with respect to representative embodiments, those skilled in the art will readily appreciate that various changes and/or modifications can be made thereto without departing from the spirit or scope of the subject disclosure as defined by the appended claims.

What is claimed is:

1. A brake assembly for stopping an elongated drive shaft of a motor, comprising:

a brake housing having friction material;

a disc assembly adapted and configured to be contained substantially within the housing, the disc assembly having a cavity for engaging the elongated drive shaft, when the brake assembly is in an engaged state, the disc assembly creates a housing frictional link with the friction material of the brake housing;

a release plate assembly having friction material, the disc assembly being intermediate the release plate assembly and the brake housing, when the brake assembly is in the engaged state, the friction material of the release plate assembly creates a release plate frictional link directly with the disc assembly;

a fixed field assembly adjacent the release plate assembly, the fixed field assembly having a coil assembly for creating a magnetic field to attract the release plate assembly to a front face thereof when the brake assembly is in a disengaged state, the fixed field assembly having a plurality of biasing members to exert a force against the release plate assembly to create the housing and release plate frictional links, the fixed field assembly defining a central opening and at least one first locking hole in a rear face; and an adjustment cap having a plate defining at least one second locking hole, the adjustment cap having an upstanding cylinder coupled to the plate for engaging the central opening such that when the adjustment cap is coupled to the fixed field assembly, the plate retains the plurality of biasing members and a variation of an insertion depth of the upstanding cylinder into the central opening selectively varies a compression of the plurality of the biasing members, and a fastener engages the at least one first and second locking holes to selectively lock a position of the adjustment cap to, in turn, set the compression of the plurality of biasing members.

2. A brake assembly as recited in claim 1, further comprising:

a ring assembly slideably attached to the disc assembly, the ring assembly having a housing ring and a release plate ring which are coupled to each other, wherein the friction material of the release plate assembly engages the release plate ring which causes the housing ring to engage the friction material of the housing assembly.

3. A brake assembly as recited in claim 1, wherein the release plate assembly further comprises:

a first plate and a second plate, each plate being capable of independently stopping the elongated drive shaft when the brake assembly is in the engaged state.

4. A brake assembly as recited in claim 1, wherein the biasing members further comprises:

a plurality of springs to exert a linear force and a plurality of o-rings to exert a non-linear force such that noise generated during operation is at most 65 dBA.

5. A brake assembly as recited in claim 1, further comprising:

a proximity sensor, integral with the field assembly, to indicate a position of the release plate assembly.

6. A brake assembly as recited in claim 1, wherein the brake housing and fixed field assembly engage to prevent contamination of the brake assembly.

7. A brake assembly as recited in claim 1, wherein the brake housing and fixed field assembly engage to transmit shearing forces from the fixed field assembly to the brake housing.

8. A brake assembly as recited in claim 1, wherein the brake housing and fixed field assembly engage to set an air gap between the release plate assembly and the disc assembly when the brake assembly is in the disengaged state.

9. A brake assembly as recited in claim 1, wherein the brake housing and fixed field assembly engage in such a manner so as to dampen sound generated therein.

10. A brake assembly as recited in claim 1, further comprising:

a diode, in parallel with the coil assembly, for reducing a rate of degradation of a magnetic field generated by the coil assembly when current is shut off to the coil assembly.

11. An elevator brake for quietly actuating and deactuating such that the elevator brake can be mounted near an elevator car, the elevator brake comprising:

a first assembly having a coil assembly to generate a magnetic field;

a second assembly opposing the first assembly;

a release plate, intermediate the first and second assemblies, adapted and configured for motion therebetween; and a biasing assembly, integral with the first assembly, sized and configured such that the biasing assembly is compressed between the first assembly and the release plate when the release plate is attracted to the first assembly by the magnetic field, wherein a force exerted by the biasing assembly increases exponentially as the release plate approaches the first assembly to, in turn, quietly move the release plate with less force as a distance between the release plate and the first assembly increases, wherein when power is shut off to the coil assembly, the biasing assembly initially overcomes the collapsing magnetic field to move the release plate towards the second assembly and decrease the force exerted by the biasing assembly such that a substantial balance occurs between the decreased force of the biasing assembly and the opposing pulling force generated by the collapsing magnetic field such that the release plate quietly frictionally links with the second assembly.

12. A system as recited in claim 11, wherein the first assembly is comprised of a fixed field assembly, having a coil assembly for creating a magnetic field to attract the second assembly thereto, and a plurality of biasing members to exert a force against the second assembly to create the housing and release plate frictional links.

13. A system recited in claim 11, wherein the second assembly is comprised of a disc assembly having a cavity for engaging the elongated drive shaft.

14. An electromagnetic brake having redundancy for parking and holding a motor with an elongated drive shaft comprising:

a housing, having a friction surface, for mounting the electromagnetic brake to the motor;

a disc assembly having a body portion adapted and configured to be contained within the housing, the disc assembly being axially fixed with respect to the elongated drive shaft and engaged to rotate therewith, and the disc assembly having a flange for receiving a first ring and a second ring, each ring being slideably engaged to the flange for motion in an axial direction, the first ring being positioned adjacent to the friction surface of the housing;

a first release plate having a friction surface;

a second release plate having a friction surface, wherein the first and second release plates are free to move in an axial direction, each release plate being adjacent to the second ring; and a fixed field cup having:

an electromagnetic coil for creating an magnetic field when current flows therethrough; and a plurality of springs for biasing the first and second release plates against the second ring; and a plurality of o-rings operationally positioned in a face of the fixed field cup, wherein when no current flows through the electromagnetic coil, at least one of the release plates is biased against the second ring, the second ring translates a force of the plurality of springs to the first ring thereby engaging the friction surface of the housing to park and hold the elongated drive shaft, wherein when current flows through the electromagnetic coil, the first and second release plates are drawn to the face of the fixed field cup and compress the o-rings, wherein the o-rings facilitate quiet operation of the brake.

15. An electromagnetic brake as recited in claim 14, further comprising an adjustment cap for varying a force applied by the field cup as required for an application of the electromagnetic brake.

16. An electromagnetic brake as recited in claim 14, further comprising:

two inductive proximity sensors mounted in the fixed field cup to determine a position of the first and second release plates, respectively, the first and second release plates having non-magnetic inserts to prevent interference between the two inductive proximity sensors when current flows through the electromagnetic coil.

17. A brake assembly comprising a field assembly, a plate and a disc assembly, the disc assembly comprising:

a body portion defining a cavity for coupling the body portion to an elongated drive shaft, the body portion having an upstanding flange which defines a plurality of holes;

a pair of rings; and a plurality of pin assemblies disposed in the plurality of holes of the upstanding flange for coupling the pair of rings thereto, wherein when the body portion is coupled to the elongated drive shaft, the body portion is axially fixed and the pair of rings move freely in an axial direction, wherein the pin assemblies further include a spring loaded ball.

18. A brake assembly as recited in claim 17, further comprising a plurality of bushings operatively positioned within the plurality of holes of the flange.

19. A brake assembly as recited in claim 17, further comprising a release plate for moving the pair of rings and a field assembly for selectively moving the pair of rings, the field assembly comprising:

a cup having a front face and a rear face, the cup defining a channel in the front face, an opening and a plurality of bores;

a coil secured within the channel for generating a magnetic field to attract the release plate towards the front face of the cup;

an adjustment cap sized and configured to engage the opening at a variable depth; and a plurality of springs for applying a biasing force to the release plate, each spring located within one of the plurality of bores wherein the variable depth of the adjustment cap sets the biasing force against the release plate away from the front face of the cup, wherein when current flows through the coil, the release plate overcomes the biasing force of the plurality of springs and moves closer to the front face and when no current flows, the biasing force moves the release plate away from the front face to move the pair of rings to a position where a frictional link is created.

20. A brake assembly as recited in claim 19, further comprising a plurality of pins, each pin located within one of the plurality of the bores between the adjustment cap and each spring therein.

21. A brake assembly as recited in claim 19, further comprising a compound to conduct heat away from the coil to prevent overheating and seal the coil within the channel to prevent corrosion.

22. An electromagnetic brake assembly comprising:

a release plate;

a field assembly for generating a magnetic flux for moving the release plate; and an inductive proximity sensor assembly for determining a position of the release plate, the inductive proximity sensor assembly comprising:

a non-magnetic insert integral with the release plate for isolating an area from the magnetic flux generated by the field assembly to prevent interference; and an inductive gauge for generating a signal based upon a position of the non-magnetic insert.

23. An electromagnetic assembly as recited in claim 22, further comprising:

a control system in communication with the inductive gauge to receive the signal and indicate the position of the non-magnetic insert.

24. An electromagnetic assembly as recited in claim 23, wherein the control system includes a circuit board having a proximity sensor circuit, a relay circuit, a logic power supply circuit and a coil power circuit.

25. An electromagnetic assembly as recited in claim 22, further comprising:

a non-magnetic insert integral in the field assembly for receiving the inductive gauge.

26. An elevator brake for quietly actuating such that the elevator brake can be mounted near an elevator car, the elevator brake comprising:

a first assembly, wherein the first assembly has a coil assembly to generate a magnetic field for attracting the release plate thereto, the coil assembly including a diode, in parallel, for slowing degradation of the magnetic field when current is shut off to the coil assembly;

a second assembly opposing the first assembly;

a release plate, intermediate the first and second assemblies, adapted and configured for motion therebetween; and a biasing assembly, integral with the first assembly, sized and configured such that the biasing assembly is compressed between the first assembly and the release plate, wherein a force exerted by the biasing assembly increases exponentially as the release plate approaches the first assembly to, in turn, quietly move the release plate with less force as a distance between the release plate and the first assembly increases.

27. An elevator system for a building having a hoistway comprising:

an elevator car disposed within the hoistway;

a counterweight operatively connected to the elevator car for balancing the weight of the elevator car;

an elevator motor assembly having a drive shaft for moving the elevator car;

a belt having a first end and a second end, the belt being wrapped around the drive shaft for operatively linking the drive shaft to the elevator car and counterweight, wherein the first end of the belt is affixed to the elevator car and the second end of the belt is affixed to the counterweight; and an elevator brake assembly mounted near the elevator car and having redundancy for parking and holding a motor with an elongated drive shaft comprising for stopping the drive shaft by creating frictional linking including:

a housing, having a friction surface, for mounting the electromagnetic brake to the motor;

a disc assembly having a body portion adapted and configured to be contained within the housing, the disc assembly being axially fixed with respect to the elongated drive shaft and engaged to rotate therewith, and the disc assembly having a flange for receiving a first ring and a second ring, each ring being slideably engaged to the flange for motion in an axial direction, the first ring being positioned adjacent to the friction surface of the housing;

a first release plate having a friction surface;

a second release plate having a friction surface, wherein the first and second release plates are free to move in an axial direction, each release plate being adjacent to the second ring; and a fixed field cup having an electromagnetic coil for creating a magnetic field when current flows therethrough, a plurality of springs for biasing the first and second release plates against the second ring and a plurality of O-rings operationally positioned in a face of the fixed field cup, wherein when no current flows through the electromagnetic coil, at least one of the release plates is biased against the second ring, the second ring translates a force of the plurality of springs to the first ring thereby engaging the friction surface of the housing to park and hold the elongated drive shaft, wherein when current flows through the electromagnetic coil, the first and second release plates are drawn to the face of the fixed field cup and compress the O-rings, wherein the O-rings facilitate quiet operation of the brake.

* * * * *